(12) United States Patent
Kristensen

(10) Patent No.: US 11,378,058 B2
(45) Date of Patent: Jul. 5, 2022

(54) VARIABLE FLOW HYDRAULIC CIRCUIT FOR A WIND TURBINE

(71) Applicant: Siemens Gamesa Renewable Energy A/S, Brande (DK)

(72) Inventor: Mikkel Aggersbjerg Kristensen, Herning (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 123 days.

(21) Appl. No.: 16/581,841

(22) Filed: Sep. 25, 2019

(65) Prior Publication Data
US 2020/0102933 A1 Apr. 2, 2020

(30) Foreign Application Priority Data

Oct. 2, 2018 (EP) ..................................... 18198368

(51) Int. Cl.
*F03D 7/02* (2006.01)
(52) U.S. Cl.
CPC ...... *F03D 7/0224* (2013.01); *F05B 2270/604* (2013.01)
(58) Field of Classification Search
CPC .................................................. F03D 7/0224
See application file for complete search history.

(56) References Cited

U.S. PATENT DOCUMENTS

| | | | | |
|---|---|---|---|---|
| 4,352,634 A | * | 10/1982 | Andrews | F03D 7/0224 416/154 |
| 4,575,309 A | * | 3/1986 | Brown | F03D 7/0252 416/41 |
| 6,254,197 B1 | * | 7/2001 | Lading | F03D 7/0244 303/2 |
| 9,593,669 B2 | * | 3/2017 | Lindholdt | F03D 7/026 |
| 10,697,481 B2 | * | 6/2020 | Baba | F15B 1/26 |

(Continued)

FOREIGN PATENT DOCUMENTS

| | | |
|---|---|---|
| CN | 101498281 A | 8/2009 |
| EP | 2535581 A2 | 12/2012 |
| EP | 3115602 A2 | 1/2017 |

OTHER PUBLICATIONS

Bud Trinkel "Pressure Control Valves", published by Hydraulics and Pneumatics (Year: 2007).*

(Continued)

*Primary Examiner* — Woody A Lee, Jr.
*Assistant Examiner* — Wesley Le Fisher
(74) *Attorney, Agent, or Firm* — Schmeiser, Olsen & Watts LLP

(57) ABSTRACT

A hydraulic circuit for a wind turbine is provided. The hydraulic circuit includes: a fixed displacement pump including a suction input and a delivery output, a pump motor for driving the fixed displacement pump, a pressure line hydraulically connected to the delivery output of the fixed displacement pump for delivering an output flow and/or an output pressure generated by the fixed displacement pump towards at least a consumer circuit, a bypass valve including a valve input hydraulically connected to the delivery output of the fixed displacement pump, wherein the bypass valve includes a variable opening for controlling the output flow or the output pressure delivered by the fixed displacement pump towards the consumer circuit(s).

10 Claims, 2 Drawing Sheets

(56) References Cited

U.S. PATENT DOCUMENTS

| | | | |
|---|---|---|---|
| 10,794,362 B2* | 10/2020 | Baba | F03D 7/024 |
| 2010/0104439 A1* | 4/2010 | Nomaguchi | F03D 9/00 |
| | | | 416/147 |
| 2010/0232964 A1 | 9/2010 | Geiger | |
| 2011/0142632 A1 | 6/2011 | Stoltz et al. | |
| 2012/0313377 A1 | 12/2012 | Mackay et al. | |
| 2014/0026969 A1* | 1/2014 | Helbig | F15B 20/004 |
| | | | 137/2 |
| 2016/0061185 A1 | 3/2016 | Vad | |
| 2020/0095987 A1* | 3/2020 | Huth | F15B 11/165 |

OTHER PUBLICATIONS

"Fixed-displacement pump delivers variable output", published by Hydraulics and Pneumatics (Year: 2008).*

NPL Proportional Control Valves—Hydraulics & Pneumatics, Book 2 Chapter 14: "Proportional Control Valves". Jun. 7, 2009. (Year: 2009).*

European Search Report dated Apr. 4, 2019 for Application No. 18198368.5.

\* cited by examiner

VARIABLE FLOW HYDRAULIC CIRCUIT FOR A WIND TURBINE

CROSS-REFERENCE TO RELATED APPLICATIONS

This application claims priority to European Application No. 18198368.5, having a filing date of Oct. 2, 2018, the entire contents of which are hereby incorporated by reference.

FIELD OF TECHNOLOGY

The following relates to a hydraulic circuit, in particular a hydraulic circuit to be included in a wind turbine. The hydraulic circuit of the embodiments generate a variable flow.

BACKGROUND

Hydraulic applications are known, in which a variable flow is required. Such applications include for example the hydraulic blade pitch systems used to control the pitch angle of the blades in a wind turbine. For some of these applications, the flow rate needs in particular to be continuously variable between zero and a maximum pre-set value.

Requirements to provide near-zero flow has led to solutions that are complex and delicate and/or having very low energy efficiency.

One possible solution for the above-mentioned problem of generating a variable flow may achieved through a hydraulic circuit comprising:
  a fixed displacement pump driven by a fixed speed motor,
  an on/off bypass valve,
  hydraulic accumulators fed by the fixed displacement pump,
  actuators fed by the hydraulic accumulators,
  proportional valves for each of the actuator.

Such hydraulic circuit is characterized by low efficiency.

Another solution is that of providing a hydraulic circuit comprising a variable displacement pump driven by a fixed speed motor. Variable displacement pump are however characterized by a highly complex structure having a reduced lifetime and increased response time. In some applications an on/off bypass valve is further required, in combination with directional or proportional valve(s) for each actuator fed by the variable displacement pump.

A further solution is that of providing a hydraulic circuit comprising:
  a fixed displacement pump driven by a variable speed motor, —an on/off bypass valve,
  directional or proportional valve(s) for each actuator fed by the fixed displacement pump.

However, fixed displacement pumps require a minimum speed different from zero to maintain lubrication on the pump itself.

Alternatively, also Digital Displacement Pumps (DDP) may be used. In DDP are piston pumps where flow is regulated by pulse modulated inlet and outlet valves at each piston, oscillating numerous times per pump revolution. This leads to increased complexity and wear with respect to more traditional and simpler pumps, in particular gear pumps, screw pumps or gerotor pumps. It is therefore still desirable to provide a new hydraulic circuit for generating a variable flow, in particular to be used in a wind turbine, in order overcome the above-mentioned inconveniences of the above described known art.

SUMMARY

An aspect relates to a hydraulic circuit for controlling the pitch angle of a plurality of blades of a wind turbine.

According to an aspect of embodiments of the present invention, a hydraulic circuit for a wind turbine, the hydraulic circuit comprises:
  a fixed displacement pump including a suction input and a delivery output,
  a pump motor for driving the fixed displacement pump,
  a pressure line hydraulically connected to the delivery output of the fixed displacement pump for delivering an output flow or an output pressure generated by the fixed displacement pump towards at least a consumer circuit,
  a bypass valve including a valve input hydraulically connected to the delivery output of the fixed displacement pump,
wherein the bypass valve includes a variable opening for controlling the output flow or the output pressure delivered by the fixed displacement pump towards the consumer circuit(s).

According to embodiments of the present invention, the bypass valve controls the output flow delivered by the fixed displacement pump towards the consumer circuit(s). In particular this may be achieved by means of a proportional bypass valve.

With respect to the cited known art, embodiments of the present invention provide the following advantages:
  the flow delivered by the fixed displacement pump can be varied continuously from zero to the full flow by controlling the opening of the bypass valve. This is an advantage over fixed displacement pumps, which, for a given pump speed, provide a near-constant flow;
  the response time for a regulation of flow rate is notably shorter for fixed displacement pump than for variable displacement pumps, as flow regulation in embodiments of the present invention only involves one bypass valve per pump, whereas regulating a variable displacement pump requires setting a valve for a control pressure to propagate through the pump or through a larger part of the hydraulic circuit to an actuator within the pump, adjusting the displacement. This allows for a faster adaptation to flow requirements, allowing the entire hydraulic circuit to respond faster, reducing loads on other parts of the machine;
  the system costs are reduced because the use of simpler components expands the supply base, allowing for a reduction in production cost;
  embodiments of the invention is particularly advantageous in applications such as pitch systems of wind turbines, where reliability is of extreme importance. Controllability of a pitch system can reduce the cost of the wind turbine as a whole through the reduction of loads on large, structural components.

Additionally, embodiments of the present invention may also be applied to many other hydraulic systems to reduce production cost while increasing reliability and efficiency.

According to exemplary embodiments of the present invention, the pump motor is of the fixed speed type, for example an asynchronous motor at fixed frequency.

Advantageously, the pump output flow can be controlled through the pump speed down to a minimum pump speed that allows lubrication to be maintained, while using the bypass valve to control the flow continuously between the full flow at the minimum pump speed down to zero. This way, the efficiency gains from a variable flow pump can be combined with small-flow controllability while maintaining the mechanical simplicity, low cost and robustness of a fixed displacement pump.

Alternatively, according to other exemplary embodiments of the present invention, the pump motor may be of the variable speed type, for example an asynchronous motor at variable frequency and/or speed. Advantageously, in these embodiments the accelerations of the motor can be reduced, thereby reducing requirements and/or loads and/or currents on the motor.

According to exemplary embodiments of the present invention, the hydraulic circuit comprises:
  a reservoir hydraulically connected to the suction input of the fixed displacement pump,
  a return line for receiving a return flow from at least a consumer circuit, the return line being hydraulically connected with the bypass valve and the reservoir.

The hydraulic circuit may comprise a filter in the return line. Particularly, the filter may be intermediate between the bypass valve and the reservoir.

Further, the hydraulic circuit may comprise a relief valve in parallel with the bypass valve for advantageously connecting the delivery output of the fixed displacement pump with the reservoir when a predefined relief pressure is reached in the pressure line.

According to other embodiments of the present invention, the bypass valve controls the output pressure delivered by the fixed displacement pump towards the consumer circuit(s). In particular this may be achieved by means of a controlled relief bypass valve.

According to embodiments of the present invention, by "consumer circuit" is meant a hydraulic circuit receiving the output flow delivered by the fixed displacement pump and/or delivering a return flow to the return line. Consumer circuits may include open-centre valves, closed-centre valves, electronic load sensing and accumulators.

BRIEF DESCRIPTION

Some of the embodiments will be described in detail, with reference to the following figures, wherein like designations denote like members, wherein.

DETAILED DESCRIPTION

Figure 1:
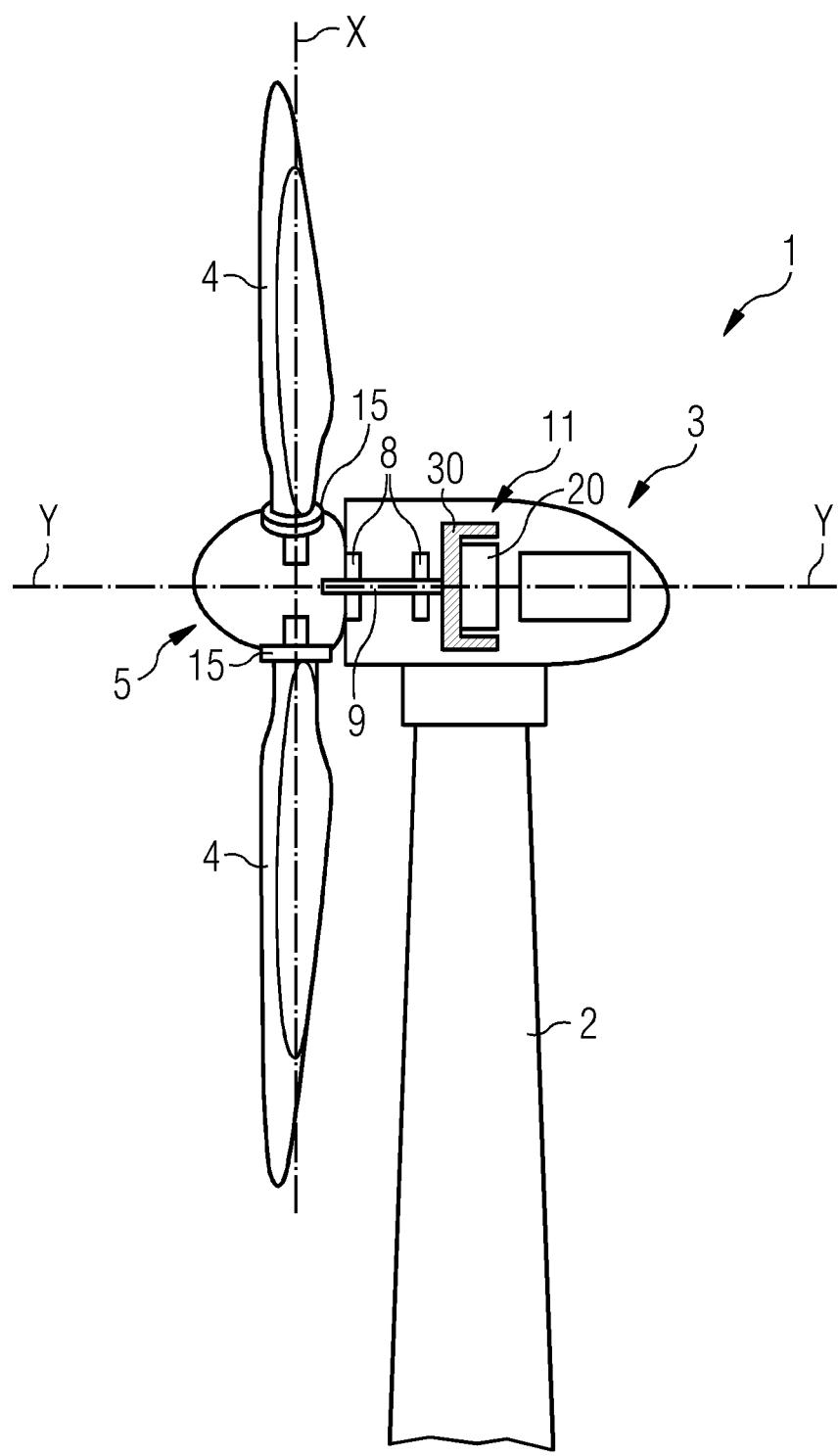
FIG. 1 shows a schematic section of a wind turbine to which the hydraulic circuit of embodiments of the present invention can be applied.

The illustrations in the drawings are schematic. It is noted that in different figures, similar or identical elements are provided with the same reference signs.

FIG. 1 shows a wind turbine 1 according to embodiments of the invention. The wind turbine 1 comprises a tower 2, which is mounted on a non-depicted foundation. A nacelle 3 is arranged on top of the tower 2.

The wind turbine 1 further comprises a wind rotor 5 having at least one blade 4 (in the embodiment of FIG. 1, the wind rotor comprises three blades 4, of which only two blades 4 are visible). The wind rotor 5 is rotatable around a rotational axis Y.

The blades 4 extend substantially radially with respect to the rotational axis Y and along a respective longitudinal axis X.

The wind turbine 1 comprises an electric generator 11, including a stator 20 and a rotor 30. The rotor 30 is rotatable with respect to the stator 20 about the rotational axis Y.

The wind rotor 5 is rotationally coupled with the electric generator 11 either directly, e.g. direct drive or by means of a rotatable main shaft 9 and/or through a gear box (not shown in FIG. 1). A schematically depicted bearing assembly 8 is provided in order to hold in place the main shaft 9 and the rotor 5. The rotatable main shaft 9 extends along the rotational axis Y.

The wind rotor 5 comprises three flanges 15 for connecting a respective blade 4 to the wind rotor 5. A pitch bearing is interposed between each blade flange 15 and the respective blade 4. A hydraulic pitch actuation system is associated to the pitch bearings of the blades 4 for regulating the pitch angle of each blade, i.e. the angular position of each blade about the respective blade longitudinal axis X.

Figure 2:
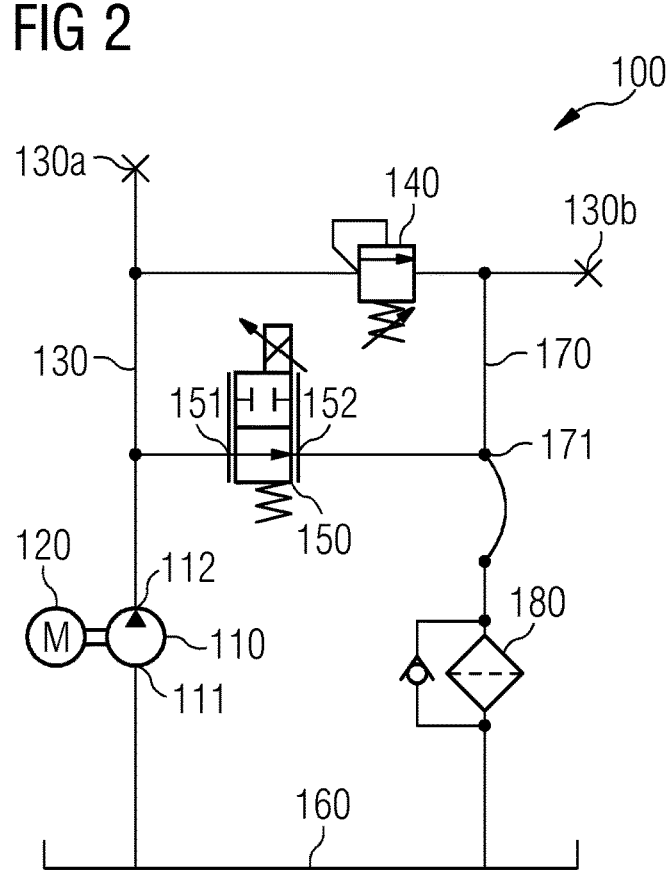
FIG. 2 shows a hydraulic scheme, illustrating a first embodiment of a hydraulic circuit.

With reference to the hydraulic scheme of FIG. 2, the hydraulic pitch actuation system for controlling the pitch angle of the blades 4 comprises a hydraulic circuit 100.

The hydraulic circuit 100 comprises a fixed displacement pump including a suction input and a delivery output.

According to embodiments of the present invention, the fixed displacement pump may be a gear pump or a screw pump or a gerotor pump.

The fixed displacement pump 110 includes a suction input 111 and a delivery output 112.

The fixed displacement pump is driven by a pump motor 120.

According to different embodiments of the present invention, the pump motor 120 may of the fixed speed type or of the variable speed type.

The hydraulic circuit 100 comprises a pressure line 130 hydraulically connected to the delivery output 112 of the fixed displacement pump 110 for delivering an output flow generated by the fixed displacement pump 110 towards at least a consumer circuit. The pressure line 130 is interposed between the delivery output 112 and a first interface 130a of the hydraulic circuit 100 for hydraulically connecting the hydraulic circuit 100 to a consumer circuit.

The hydraulic circuit 100 comprises a bypass valve 150 including a valve input 151 and a valve output 152. The valve input 151 is hydraulically connected to the delivery output 112 of the fixed displacement pump 110.

The bypass valve 150 includes a variable opening for controlling the output flow delivered by the fixed displacement pump 110 towards the consumer circuit to be attached to the first interface 130a.

According to embodiments of the present invention, the bypass valve 150 is a proportional valve.

The hydraulic circuit 100 further comprises:
  a reservoir 160 hydraulically connected to the suction input 111 of the fixed displacement pump 110.
  a return line 170 for receiving a return flow from at least a consumer circuit.

The return line 170 is interposed between the reservoir 160 and a second interface 130b of the hydraulic circuit 100 for hydraulically connecting the hydraulic circuit 100 to a consumer circuit. According to different embodiments of the present invention, the consumer circuit hydraulically connected to the return line 170 may be the same or another circuit with respect to the consumer circuit hydraulically connected to the pressure line 130.

The return line 170 is hydraulically connected with the valve output 152 of the bypass valve 150 at an intermediate point 171 between the second interface 130b and the reservoir 160.

The hydraulic circuit 100 may further comprise a filter 180 in the return line 170. The filter 180 is intermediate between the bypass valve 150 and the reservoir 160, in such a way that the flow exiting the valve output 152 of the bypass valve 150 reaches the reservoir 160 through the filter 180.

The hydraulic circuit 100 comprises a relief valve 140 in parallel with the bypass valve 150 for connecting the delivery output 112 of the fixed displacement pump 110 with the reservoir 160 when a predefined relief pressure is reached in the pressure line 130.

The bypass valve 150 and the relief valve 140 are provided in two respective branches of the hydraulic circuit 100, both connecting the pressure line 130 with the return line 170.

Figure 3:
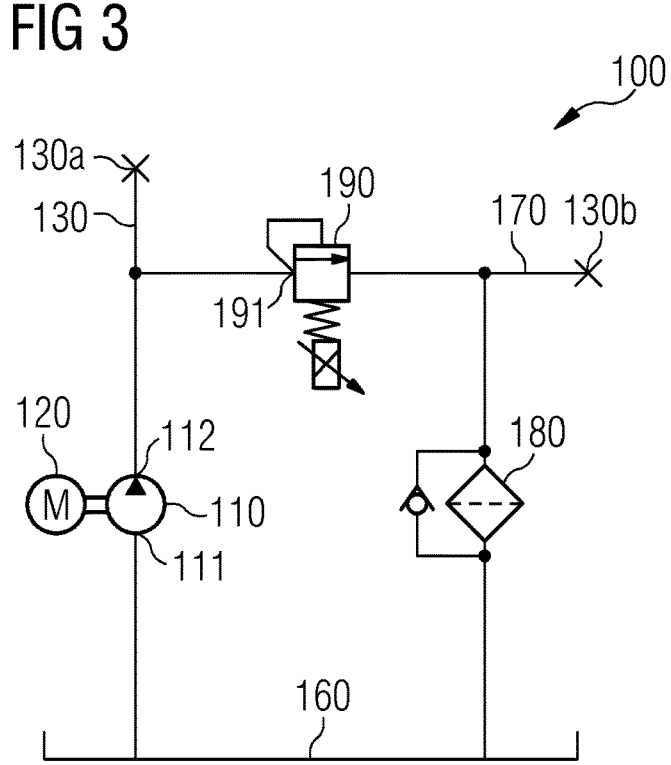
FIG. 3 shows a hydraulic scheme, illustrating a second embodiment of a hydraulic circuit.

With reference to the hydraulic scheme of FIG. 3, a second embodiment of the hydraulic circuit 100 is shown. With respect to the embodiment of FIG. 3, no proportional valve is present, but a bypass valve 190, which is a relief valve for connecting the delivery output 112 of the fixed displacement pump 110 with the reservoir 160 when a controlled relief pressure is reached in the pressure line 130. The bypass valve 190 comprises a valve input 191 is hydraulically connected to the delivery output 112 of the fixed displacement pump 110. The relief valve 190 connects the pressure line 130 with the return line 170. The opening of the bypass valve 190 is controlled for controlling the output pressure delivered by the fixed displacement pump 110 towards the consumer circuit attached to the first interface 130a.

Although the present invention has been disclosed in the form of preferred embodiments and variations thereon, it will be understood that numerous additional modifications and variations could be made thereto without departing from the scope of the intention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. A hydraulic circuit for a wind turbine, the hydraulic circuit comprising:
   a fixed displacement pump including a suction input and a delivery output;
   a pump motor for driving the fixed displacement pump;
   a pressure line hydraulically connected to the delivery output of the fixed displacement pump for delivering an output flow and/or an output pressure generated by the fixed displacement pump towards at least one consumer circuit;
   a bypass valve including a valve input hydraulically connected to the delivery output of the fixed displacement pump;
   a reservoir hydraulically connected to the suction input of the fixed displacement pump; and
   a return line for receiving a return flow from the at least one consumer circuit, the return line being hydraulically connected with the bypass valve and the reservoir,
   wherein the bypass valve includes a variable opening for controlling the output flow or the output pressure delivered by the fixed displacement pump towards the at least one consumer circuit, and
   wherein the bypass valve is a proportional valve and the hydraulic circuit further comprises a relief valve in parallel with the bypass valve for connecting the delivery output of the fixed displacement pump with a reservoir when a predefined relief pressure is reached in the pressure line.

2. The hydraulic circuit according to claim 1, wherein the pump motor is of a fixed speed type.

3. The hydraulic circuit according to claim 1, wherein the pump motor is of a variable speed type.

4. The hydraulic circuit according to claim 1, wherein the hydraulic circuit comprises a filter in the return line.

5. The hydraulic circuit according to claim 4, wherein the filter in the return line is intermediate between the bypass valve and the reservoir.

6. The hydraulic circuit according to claim 1, wherein the bypass valve is a relief valve for connecting the delivery output of the fixed displacement pump with a reservoir when a controlled relief pressure is reached in the pressure line.

7. A wind turbine including a hydraulic circuit according to claim 1.

8. The wind turbine according to claim 7, wherein the hydraulic circuit is integrated in a system for controlling a pitch angle of a plurality of blades of the wind turbine.

9. The hydraulic circuit according to claim 1, wherein the at least one consumer circuit is located in parallel to the relief valve and the bypass valve.

10. The hydraulic circuit according to claim 9, wherein the output flow of the fixed displacement pump passes through only one of the consumer circuit, the relief valve and the bypass valve in completing the hydraulic circuit.

* * * * *